United States Patent
Rudelic et al.

(10) Patent No.: US 7,865,740 B2
(45) Date of Patent: Jan. 4, 2011

(54) LOGGING CHANGES TO BLOCKS IN A NON-VOLATILE MEMORY

(75) Inventors: John C. Rudelic, Folsom, CA (US); Sean S. Eilert, Penryn, CA (US)

(73) Assignee: INTEL Corporation, Santa Clara, CA (US)

( * ) Notice: Subject to any disclaimer, the term of this patent is extended or adjusted under 35 U.S.C. 154(b) by 1480 days.

(21) Appl. No.: 11/237,305

(22) Filed: Sep. 27, 2005

(65) Prior Publication Data

US 2007/0074048 A1    Mar. 29, 2007

(51) Int. Cl.
*G06F 12/14* (2006.01)
(52) U.S. Cl. .............................. 713/193; 713/2; 726/27
(58) Field of Classification Search ...... 713/1, 713/2, 187, 189, 193; 726/27, 30; 345/565, 345/571; 710/23; 711/101; 714/702, 710, 714/722, 763
See application file for complete search history.

(56) References Cited

U.S. PATENT DOCUMENTS

| | | | | |
|---|---|---|---|---|
| 4,782,486 A | * | 11/1988 | Lipcon et al. | 714/722 |
| 5,347,648 A | * | 9/1994 | Stamm et al. | 714/5 |
| 5,442,704 A | * | 8/1995 | Holtey | 711/163 |
| 5,954,818 A | * | 9/1999 | Dalvi et al. | 726/16 |
| 6,177,860 B1 | * | 1/2001 | Cromer et al. | 340/10.1 |
| 6,778,096 B1 | * | 8/2004 | Ward et al. | 713/1 |
| 6,795,905 B1 | * | 9/2004 | Ellison et al. | 711/163 |
| 7,340,596 B1 | * | 3/2008 | Crosland et al. | 713/100 |
| 7,533,274 B2 | * | 5/2009 | Freeman et al. | 713/189 |
| 2007/0074048 A1 | * | 3/2007 | Rudelic et al. | 713/193 |

OTHER PUBLICATIONS

Intel Corporation, "Intel Advanced+ Boot Block Flash Memory (C3)", *Datasheet*, Order No. 290645, Revision: 023, May 2005, pp. 1-72.
US Patent Application, filed Sep. 27, 2005, entitled "Secure Booting From a Memory Device", invented by J.C. Rudelic.

* cited by examiner

*Primary Examiner*—Benjamin E Lanier
*Assistant Examiner*—Hadi Armouche
(74) *Attorney, Agent, or Firm*—Konrad Raynes & Victor LLP; David W. Victor (57) ABSTRACT

Provided are a method and device for logging changes to blocks in a non-volatile memory. Security bits are maintained for blocks of cells in a non-volatile memory device indicating whether data in the blocks has been modified. The security bit for one block is set to indicate modification in response to detecting that at least one cell in the block was modified.

23 Claims, 3 Drawing Sheets

LOGGING CHANGES TO BLOCKS IN A NON-VOLATILE MEMORY

BACKGROUND

In many devices, such as cell phones and other programmable electronic devices, the operating system and application code may be stored in a flash memory device and loaded into memory to initialize the runtime environment. Alternatively, for certain flash memory devices, such as NOR flash, the code may be executed directly from the flash memory. Malicious code, known as malware, which includes viruses, worms, adware, etc., may attack core components of the operating system to compromise key applications, including critical applications that operate in the operating system kernel. One concern is that malicious code may be loaded into blocks in the flash memory device and then executed during operations of the programmable device.

To ensure the integrity of the data and code maintained in the flash memory, the boot process may scan the content of each block in the flash memory to calculate a hash or checksum value to compare against a stored valid value to determine whether code or data has been modified. If the code in the blocks of the non-volatile memory device do not validate during initialization, then the boot sequence will fail and the electronic device may not go into operational mode until valid code is reinstalled in the flash memory.

DETAILED DESCRIPTION

Figure 1:
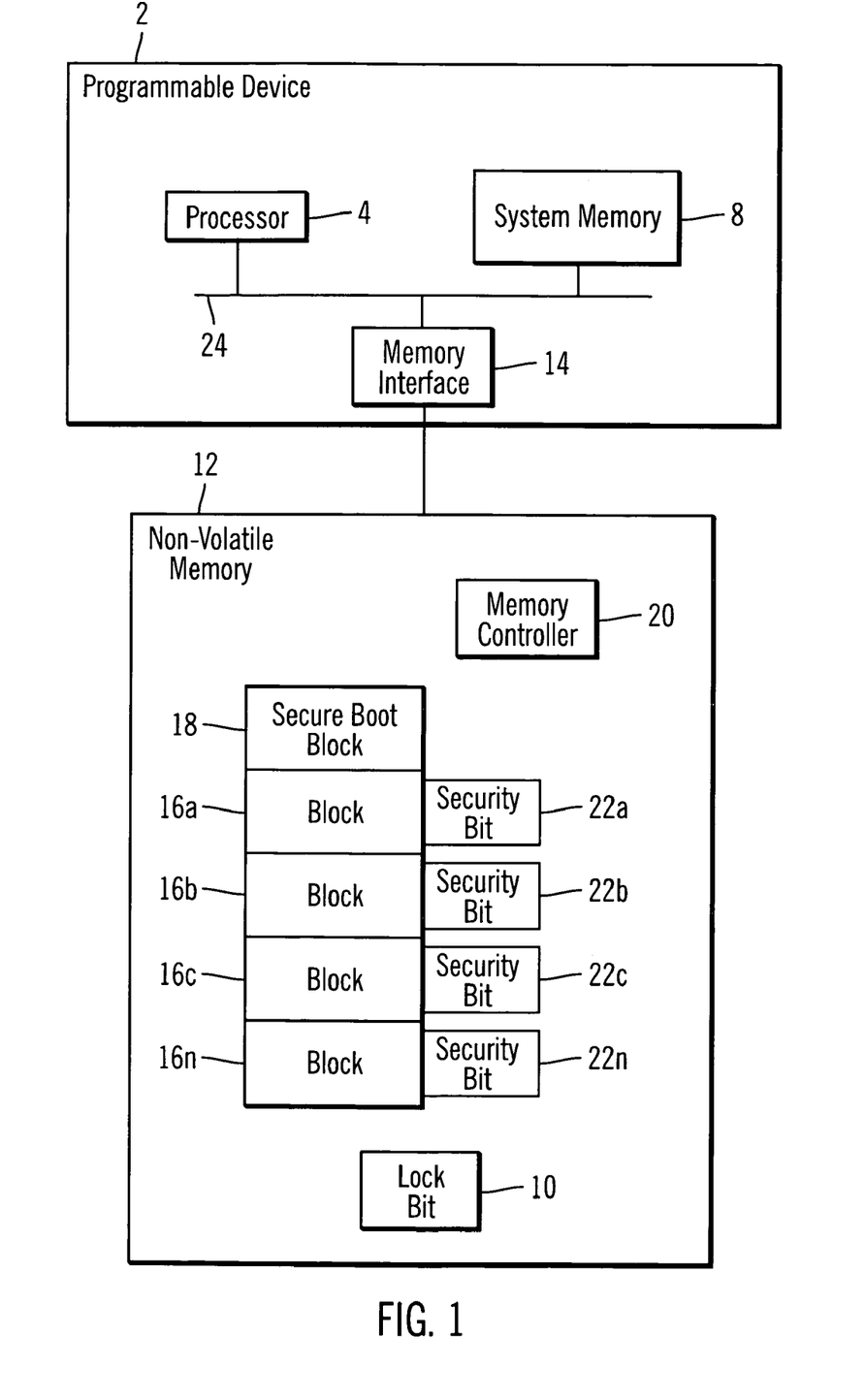
FIG. 1 an embodiment of a computing environment.

FIG. 1 illustrates a computing environment in which described embodiments are implemented. A programmable device 2 includes a processor 4 that stores data in a system memory 8 and is in communication with a non-volatile memory device 12. The non-volatile memory 12 may include boot code in a secure boot block 18 that the processor 4 executes to initialize the programmable device 2. In one embodiment, the processor 4 may execute operating system and application programs from the non-volatile memory 12. Alternatively, the processor 4 may load the operating system and applications into the memory 8 to execute. Alternatively, the boot code executed by the processor 4 may be maintained in a boot Read Only Memory (ROM) (not shown) in the programmable device 2. The non-volatile memory 12 further includes a lock bit 10 that indicates whether to log modifications to blocks of cells in the non-volatile memory device 12. In an alternative embodiment, the lock bit 10 may be maintained in the programmable device 2.

The programmable device 2 may comprise computational devices known in the art, such as a desktop computer, telephony device (cellular or mobile phone), personal digital assistant (PDA), workstation, server, mainframe, laptop, etc. The system memory 8 may comprise one or more volatile memory devices. The non-volatile memory device 12 may comprise certain non-volatile electronic memory devices known in the art, such as an Electrically-Erasable Programmable Read-Only Memory (EEPROM), including NAND and NOR flash memories, USB flash drive, etc. Alternatively, the non-volatile memory may comprise a magnetic storage device. The non-volatile memory device 12 may be coupled to a physical interface 14 of the programmable device 2. In one embodiment, the non-volatile memory device 12 may be removably coupled to the interface 14, such that it may be readily removed and replaced with a different non-volatile memory device, such as for a different user. In certain embodiments, such as when the non-volatile memory device 12 comprises a NOR flash, the non-volatile memory 12 may be coupled directly to the bus 24 of the programmable device 2.

In one embodiment, the code used by the programmable device 2 is stored in blocks 16a, 16b, 16c . . . 16n in the non-volatile memory device 12. Each block 16a, 16b, 16c . . . 16n comprises a plurality of cells in the memory device 12, where each cell provides non-volatile storage of an electric charge representing data. The cell maintains the charge, i.e., electrons, even when power is not supplied to the memory device 12. In NOR flash memories, the code may be executed directly from the memory device 12. In NAND flash memories, the code may be loaded from the NAND into the system memory 8 and the processor 4 executes the code from the system memory 8. The non-volatile memory device 12 may further include a secure boot block 18 that includes the boot sequence the processor 4 executes to load the operating system and applications and initialize the runtime environment.

A memory controller 20 performs the write and erase operations with respect to the cells in the memory device 12 blocks 16a, 16b . . . 16n. In one embodiment, the memory controller 20 maintains a security bit 22a, 22b, 22c . . . 22n for each data block 16a, 16b, 16c . . . 16n indicating whether the block has been modified. Each block 16a, 16b, 16c . . . 16n may comprise a group of cells that may be erased, e.g., changed from a "0" to "1", as part of a single erase operation. In an alternative embodiment, one security bit may be used to indicate modifications to a plurality of blocks, such that if one of the blocks associated with the security bit has changed, the security bit will be set to indicate the modification. Further, there may be security bits for all the blocks in the non-volatile memory, or certain blocks may not have an associated security bit to log changes, such as the secure boot block 18 which may be protected by other techniques. The security bits may be stored in the non-volatile memory 12, with the block being protected or in another location of the non-volatile memory 12. In an alternative embodiment, the security bits 22a, 22b . . . 22c . . . 22d may be stored in a non-volatile memory location in the programmable device 2.

The processor 4, system memory 8 and memory interface 14 may communicate via a bus 24 interface.

In one embodiment, the value of the lock bit 10 in the non-volatile memory 12 indicates whether the memory controller 20 is to set the security bit 22a, 22b . . . 22n to indicate modifications to the blocks 16a, 16b . . . 16n. Further, this lock bit 10 may be set to indicate not to log modifications for modifications, such as modifications made by a boot sequence. This allows modifications made by secure boot code, such as updating code or data in the blocks 16a, 16b . . . 16n without indicating such modifications in the security bits, because such modifications may be assumed to be authorized and secure. After the boot sequence completes, modifications to the blocks 16a, 16b . . . 16n by processes other than the boot sequence are logged and indicated in the security bit 22a, 22b . . . 22n corresponding to the modified block 16a, 16b . . . 16n.

The memory controller 20 receives I/O requests via the memory interface 14. The memory interface 14 may include a data transfer protocol, such as a Flash Memory protocol, the Universal Serial Bus (USB) protocol or other data transfer protocols known in the art. In response to a power-on reset, the memory controller 20 may set the lock bit 10 to indicate not to log changes by the boot sequence code to the blocks 16a, 16 . . . 16n "0".

In FIG. 1, the memory controller 20 is shown implemented in the non-volatile memory 12 device, i.e., integrated circuit. In an alternative embodiment, the memory controller 20 may be implemented in the programmable device 2 with the memory interface 14 or implemented in both the programmable device 2 and in the non-volatile memory 12 device. In embodiments where the non-volatile memory 12 is coupled directly to the bus, the memory interface 14 is implemented in the non-volatile memory 12 unit.

The memory controller 20 maintains security bits 22a, 22b, 22c . . . 2n for the blocks 16a, 16b, 16c . . . 16n of cells indicating whether data in the blocks has been modified. In the embodiment of FIG. 1, there is one security bit for each block of cells in the non-volatile memory 12. Upon initializing or formatting the non-volatile memory 12, the memory controller 20 may set all the security bits 22a, 22b . . . 22n to a value indicating no modification, such as a "1" when initializing all cells in the blocks 16a, 16b . . . 16n to "1".

Figure 2:
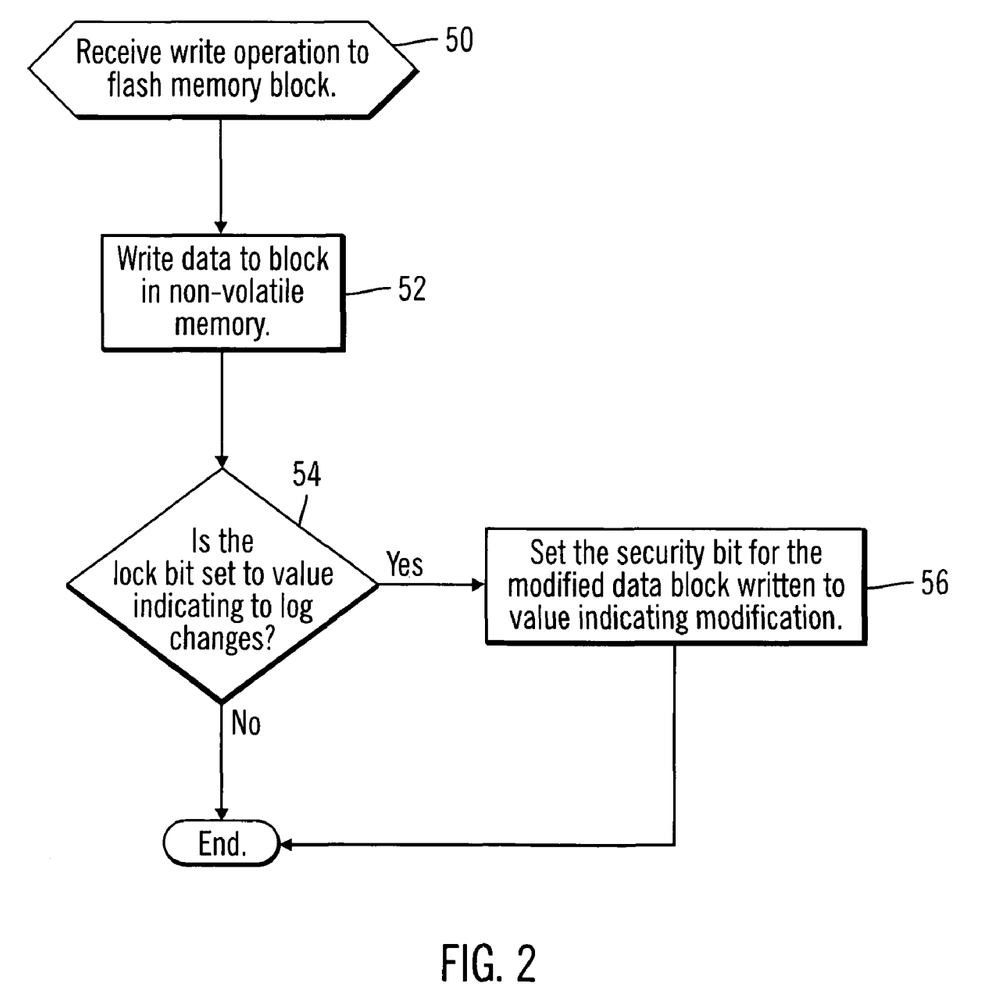
FIG. 2 illustrates an embodiment of operations performed by a memory controller to log modifications to blocks in a non-volatile memory device.

FIG. 2 illustrates an embodiment of operations implemented in the logic of the memory controller 20 to process write operations to the blocks in the non-volatile memory 12. Upon receiving (at block 50) a write operation to a non-volatile memory block 16a, 16b . . . 16n via the memory interface 14, which originated from the processor 4 or some other component, the memory controller 20 writes (at block 52) the data to the target block 16a, 16b . . . 16n. If (at block 54) the lock bit 10 is set to indicate that modifications should be logged, e.g., set to "0" or "1", then the memory controller 20 sets (at block 56) the security bit 22a, 22b, 22c . . . 22n for the modified data block written to indicate that the block has been modified. By setting the security bit to indicate modification, the memory controller 20 logs that data in the block associated with that security bit was modified. Otherwise, if (at block 54) the lock bit 10 indicates to not log modifications, then control ends.

Figure 3:
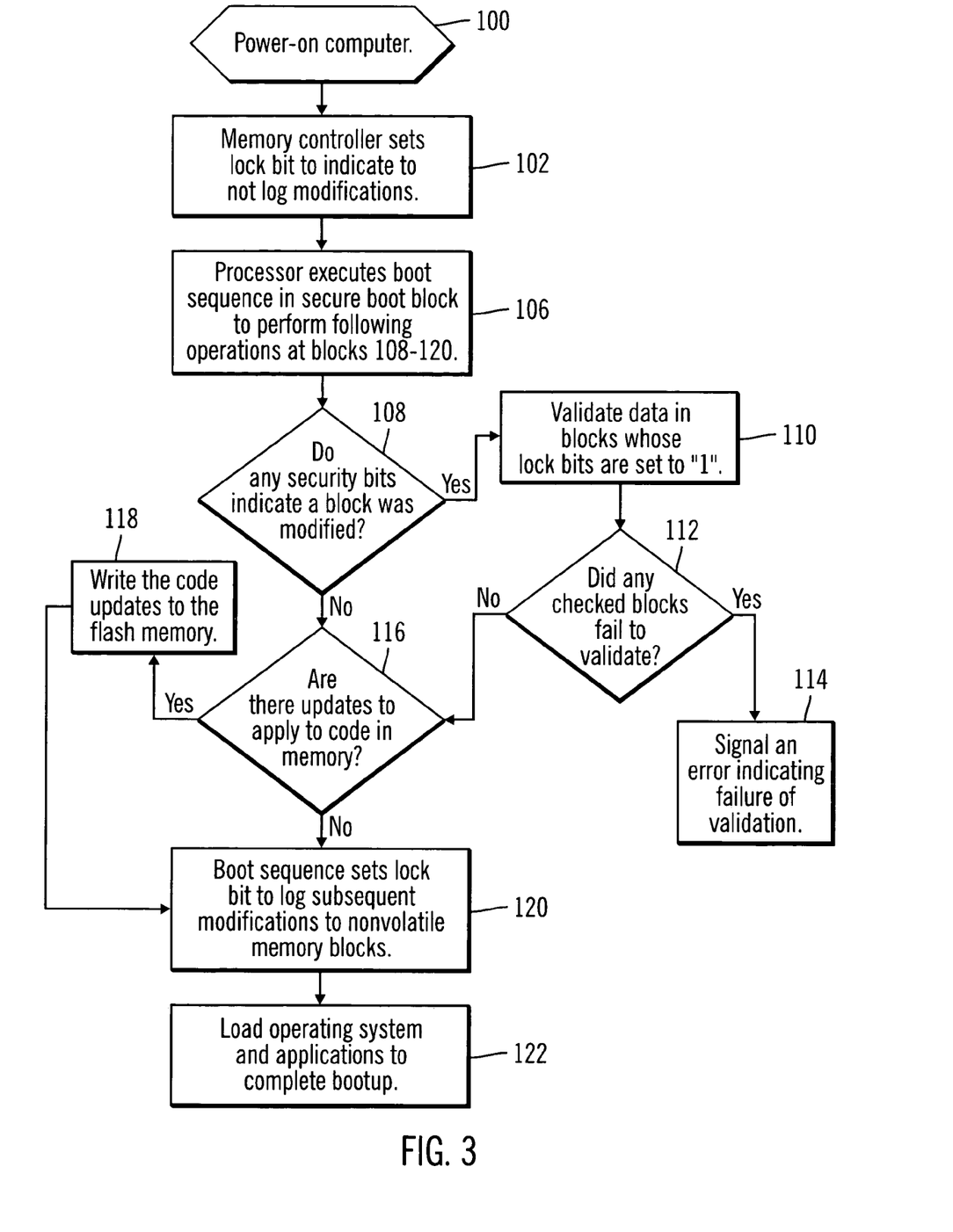
FIG. 3 illustrates an embodiment of operations performed by a boot sequence with respect to a non-volatile memory device.

FIG. 3 illustrates an embodiment of operations performed by the memory controller 20 and the processor 4 executing a boot sequence. Control begins at block 100 in response to an event, such as a cold or warm start or power cycle. In response to the event, the memory controller 20 sets (at block 102) the lock bit 10 to indicate that updates to the non-volatile memory 12 are not to be logged in the security bits 22a, 22b . . . 22n, e.g., set to "0", "1" or some other value. The processor 4 then performs the initialization or power-on sequence and executes (at block 106) the boot code in the secure boot block 18 to perform the boot sequence operations at blocks 108-120. In an alternative embodiment, certain or all of the boot sequence code operations may be maintained in a boot ROM in the programmable device 2.

The executed boot sequence determines (at block 108) whether any security bits 22a, 22b . . . 22n indicate that a block was modified, e.g., a "0" or "1". If so, then the boot sequence performs (at block 110) a validation operation on the modified blocks. This validation operation may involve scanning the modified block 16a, 16b . . . 16n to produce a checksum or hash value and compare that value with a check code maintained in the non-volatile memory 12 or programmable device 2 for the code in the scanned block to determine whether the data or code in the block 16a, 16b . . . 16n is valid.

If (at block 112) any of the modified blocks 16a, 16b . . . 16n failed to validate, then the memory controller 20 signals (at block 114) an error message indicating that validation failed. Action may be taken by the programmable device 2 in response to this error message to fail the boot sequence or perform some other operation.

Otherwise, if no blocks 16a, 16b . . . . 16n were modified (from the no branch of block 108) or if all modified blocks 16a, 16b . . . 16n were validated (from the no branch of block 112), then the boot sequence determines (at block 116) whether there are updates to apply. If so, then the boot sequence writes (at block 118) the updates to the blocks 16a, 16b . . . 16n in the non-volatile memory 12. In one embodiment, the boot sequence may connect to a network to determine whether there are any updates at a secure site to apply to the programmable device 2, such as updates to an operating system and applications. These write operations by the boot sequence do not result in the security bit 22a . . . 22n for the modified blocks being set because at this point the lock bit 10 is set to indicate that modifications to the blocks are not logged.

After applying any updates (at block 118) or if there are no updates (from the no branch of block 116), then the boot sequence sets (at block 120) the lock bit 10 to indicate that subsequent modifications to the blocks 16a, 16b . . . 16n are to be logged, e.g., to "1" or some other value. The boot sequence further loads (at block 122) the operating system and any applications to complete the boot sequence and initialize the runtime environment.

In further embodiments, the processor 4 executing code in the runtime environment may selectively determine modified blocks 16a, 16b . . . 16n from the security bits 22a, 22b . . . 22n to validate the data and code in the modified blocks during runtime.

With described embodiments, a boot sequence may readily determine blocks in a non-volatile memory device, such as an EEPROM (which includes flash memory devices), that have been modified and then validate those modified blocks. Validation may occur during a subsequent boot sequence before loading the modified code. Further, the boot sequence may update blocks in the non-volatile memory without the changes being logged so that modifications made by the boot sequence are not validated after the boot sequence applied such updates in order to speed-up the boot sequence.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. Of course, those skilled in the art will recognize that many modifications may be made to this configuration without departing from the scope of the present invention, and that the article of manufacture may comprise suitable information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In described embodiments, the security bits were maintained for blocks in an EEPROM or flash memory device. In an additional embodiment, the security bits may be used to indicate modified blocks in a volatile memory device in a system, such that data in the modified blocks in the volatile memory device may be validated. Further, the security bits may be used for electric non-volatile memory devices or other types of non-volatile memory to which data may be written multiple times, such as magnetic storage, writable optical storage, etc. In non-electronic memory devices, the cells may be implemented as magnetic charges, optical markings, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or that a different number of devices may be used than the multiple number shown.

The functionality and/or the features of a device may be alternatively embodied by one or more other devices which are not explicitly described as having such functionality/features. Thus, other embodiments of the present invention need not include the device itself.

The illustrated operations of FIGS. 2 and 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    maintaining security bits for blocks of cells in a non-volatile memory device indicating whether data in the blocks has been modified;
    setting a lock bit, wherein the lock bit has a first or second value;
    receiving a write request of data to write to a target block of the blocks of cells;
    writing the write request data to the target block;
    determining if the lock bit is set to the first or the second value;
    setting the security bit for the target block to indicate modification in response to determining that the lock bit has the first value, wherein the security bit for the target block is not set to indicate modification when the lock bit has the second value;
    validating data in the blocks whose security bits indicate that the blocks were modified;
    executing code in the non-volatile memory device to perform a boot sequence to initialize a runtime environment; and
    updating a block in the memory device, wherein the security bit associated with the updated block is not set to indicate that the block was modified when updating the block during the boot sequence, and wherein the security bit is set in response to updating the associated block after the boot sequence.

2. The method of claim 1, wherein the non-volatile memory device comprises an EEPROM and wherein the security bits are implemented in the EEPROM.

3. A method, comprising:
maintaining security bits for blocks of cells in a memory device indicating whether data in the blocks has been modified;
maintaining a lock bit having a first or second value;
receiving a write request of data to write to a target block of the blocks of cells;
writing the write request data to the target block;
determining if the lock bit is set to the first or the second value;
setting the security bit for the target block to indicate modification in response to determining that the lock bit has the first value, wherein the security bit for the target block is not set to indicate modification when the lock bit has the second value;
validating data in the blocks whose security bits indicate that the blocks were modified;
executing boot code to perform a boot sequence to initialize a runtime environment; and
updating a block in the memory device, wherein the security bit associated with the updated block is not set to indicate that the block was modified when updating the block during the boot sequence, and wherein the security bit is set in response to updating the associated block after the boot sequence.

4. The method of claim 3, wherein a boot sequence validates data in the blocks whose security bits indicate that the blocks were modified.

5. The method of claim 4, further comprising:
signaling an error in response to determining that the data in the blocks that was modified does not validate.

6. The method of claim 3, further comprising:
setting the lock bit to the second value in response to a reset event that invokes the executing of the boot code to perform the a boot sequence, wherein the boot sequence validates the data in the blocks; and
setting, by boot code, the lock to the first value in response to validating the data in the blocks and applying any updates.

7. The method of claim 6, wherein the reset event comprises a power-on reset.

8. The method of claim 6, wherein the memory device comprises an EEPROM, wherein the boot sequence is stored in a secure boot block in the EEPROM, and wherein a memory controller sets the lock bit to the second value in response to the reset event.

9. The method of claim 6, wherein the memory device comprises an EEPROM, wherein a memory controller of the memory device maintains and sets the security bits for the blocks in the EEPROM, wherein the boot sequence and the lock bit are maintained in the EEPROM.

10. A device, comprising:
a non-volatile memory including blocks of cells;
security bits for the blocks of cells indicating whether data in the blocks has been modified;
a lock bit, wherein the lock bit has a first or second value;
boot code included in at least one of the blocks, wherein the code is executed to perform:
validating data in the blocks whose security bits indicate that the blocks were modified;
performing a boot sequence to initialize a runtime environment; and
updating one of the blocks in the memory device, wherein the security bit associated with the updated block is not set to indicate that the block was modified when updating the block during the boot sequence, and wherein the security bit is set in response to updating the associated block after the boot sequence; and
circuitry for performing operations, the operations comprising:
receiving a write request of data to write to a target block of the blocks of cells;
writing the write request data to the target block;
determining if the lock bit is set to the first or the second value;
setting the security bit for the block to indicate modification in response to determining that the lock bit has the first value, and wherein the security bit for the target block is not set to indicate modification when the lock bit has the second value.

11. The device of claim 10, wherein the non-volatile memory comprises an EEPROM and wherein the security bits are implemented in the EEPROM.

12. A device accessible to a programmable device, comprising:
a memory including blocks of cells;
a lock bit having a first or second value;
security bits for the blocks of cells indicating whether data in the blocks has been modified;
circuitry to cause operations, the operations comprising:
receiving a write request of data to write to a target block of the blocks of cells;
writing the write request data to the target block;
determining if the lock bit is set to the first or the second value;
setting the security bit for the target block to indicate modification in response to determining that the lock bit for the target block has the first value, and wherein the security bit for the target block is not set to indicate modification when the lock bit has the second value; and
boot code in at least one of the block of cells executed by the programmable device to perform operations, comprising:
validating data in the blocks whose security bits indicate that the blocks were modified;
performing a boot sequence to initialize a runtime environment; and
updating a block in the memory device, wherein the security bit associated with the updated block is not set to indicate that the block was modified when updating the block during the boot sequence, and wherein the security bit is set in response to updating the associated block after the boot sequence.

13. The device of claim 12, wherein the circuitry causes further operations comprising:
setting the lock bit to the second value in response to a reset event that invokes the boot code to execute the boot sequence, wherein the boot code further causes operations comprising setting the lock bit to the first value in response to validating the data in the blocks and applying any updates.

14. A system, comprising:
a programmable device; and
a non-volatile electronic memory device coupled to the programmable device, comprising:
blocks of cells;

security bits for the blocks of cells indicating whether data in the blocks has been modified;
a lock bit, wherein the lock bit has a first or second value; and
circuitry to cause operations, the operations comprising:
receiving a write request of data to write to a target block of the blocks of cells;
writing the write request data to the target block;
determining if the lock bit is set to the first or the second value;
setting the security bit for the target block to indicate modification in response to determining that the lock bit has the first value, and wherein the security bit for the target block is not set to indicate modification when the lock bit has the second value; and
boot code executed by the programmable device to perform operations, the operations comprising:
validating data in the blocks whose security bits indicate that the blocks were modified;
performing a boot sequence to initialize a runtime environment; and
updating a block in the memory device, wherein the security bit associated with the updated block is not set to indicate that the block was modified when updating the block during the boot sequence, and wherein the security bit is set in response to updating the associated block after the boot sequence.

15. The system of claim 14, wherein the boot sequence operations further comprise:
signaling an error in response to determining that the data in the blocks that was modified does not validate.

16. A system, comprising:
a programmable device; and
a non-volatile electronic memory device coupled to the programmable device, comprising:
blocks of cells;
a lock bit having a first or second value;
security bits for the blocks of cells indicating whether data in the blocks has been modified;
boot code executed by the programmable device to perform boot sequence operations comprising:
validating data in blocks whose security bits indicate that the blocks were modified;
initializing a runtime environment; and
updating one of the blocks in the memory device, wherein the security bit associated with the updated block is not set to indicate that the block was modified when updating the block during the boot sequence, and wherein the security bit is set in response to updating the associated block after the boot sequence;
circuitry to cause operations, the operations comprising:
receiving a write request of data to write to a target block of the blocks of cells;
writing the write request data to the target block;
determining if the lock bit is set to the first or the second value;
setting the security bit for the target block to indicate modification in response to determining that the lock bit has the first value, and wherein the security bit is not set to indicate modification when the lock bit has the second value.

17. The system of claim 16, wherein the circuitry further causes operations comprising setting the lock bit to the second value in response to a reset event that invokes the boot sequence, and wherein the boot sequence further sets the lock bit to the first value in response to validating the data in the blocks and applying any updates.

18. The system of claim 17, wherein the reset event comprises a power-on reset.

19. The system of claim 17, wherein the non-volatile electronic memory device comprises an EEPROM, wherein the boot sequence is stored in a secure boot block in the EEPROM, and wherein a memory controller sets the lock bit to the second value in response to the reset event.

20. An article of manufacture comprising hardware logic implemented in a memory controller in communication with a non-volatile memory including blocks of cells, wherein the hardware logic causes operations to be performed, the operations comprising:
providing a lock bit, wherein the lock bit has a first or second value;
providing security bits for the blocks of cells indicating whether data in the blocks has been modified;
receiving a write request of data to write to a target block of the blocks of cells;
writing the write request data to the target block;
determining if the lock bit is set to the first or the second value; and
setting the security bit for the target block to indicate modification in response to determining that the lock bit has the first value, and wherein the security bit for the target block is not set to indicate modification when the lock bit has the second value;
providing access to boot code included in at least one of the blocks of cells, wherein the boot code is executed to perform:
validating data in the blocks whose security bits indicate that the blocks were modified;
performing a boot sequence to initialize a runtime environment; and
updating one of the blocks in the memory device, wherein the security bit associated with the updated block is not set to indicate that the block was modified when updating the block during the boot sequence, and wherein the security bit is set in response to updating the associated block after the boot sequence.

21. The article of manufacture of claim 20, wherein the non-volatile memory comprises an EEPROM.

22. An article of manufacture comprising hardware logic implemented in a memory controller, in communication with a memory including blocks of cells, and a computer readable storage medium including boot code executed by a programmable device, wherein the programmable device is accesses the memory, and wherein the hardware logic and boot code execute to cause operations, the operations comprising:
providing, by the hardware logic, a lock bit having a first or second value;
providing, by the hardware logic, security bits for the blocks of cells indicating whether data in the blocks has been modified;
receiving by the hardware logic, a write request of data to write to a target block of the blocks of cells;
writing by the hardware logic, the write request data to the target block;
determining by the hardware logic, if the lock bit is set to the first or the second value;
setting by the hardware logic, a security bit of the security bits for the target block to indicate modification in response to determining that the lock bit has the first value and wherein the security bit for the target block is not set to indicate modification when the lock bit has the second value; and validating, by the boot code, data in the blocks whose security bits indicate that the blocks were modified;

performing, by the boot code, a boot sequence to initialize a runtime environment; and updating, by the boot code, one of the blocks in the memory device, wherein the security bit associated with the updated block is not set to indicate that the block was modified when updating the block during the boot sequence, and wherein the security bit is set in response to updating the associated block after the boot sequence.

23. The article of manufacture of claim 22, wherein the operations further comprise:

setting, by the boot code, the lock bit to the second value in response to a reset event that invokes the boot code to execute the boot sequence, wherein the boot code further causes operations comprising setting the lock bit to the first value in response to validating the data in the blocks and applying any updates.

* * * * *

UNITED STATES PATENT AND TRADEMARK OFFICE
CERTIFICATE OF CORRECTION

| | | |
|---|---|---|
| PATENT NO. | : 7,865,740 B2 | Page 1 of 1 |
| APPLICATION NO. | : 11/237305 | |
| DATED | : January 4, 2011 | |
| INVENTOR(S) | : Rudelic et al. | |

It is certified that error appears in the above-identified patent and that said Letters Patent is hereby corrected as shown below:

In the Claims

Claim 6, Column 7, Line 41, "the a boot sequence" should read --the boot sequence--.

Signed and Sealed this
Third Day of March, 2015

Michelle K. Lee
*Deputy Director of the United States Patent and Trademark Office*